P. McDERMOTT & J. P. HYDE.
Means for Preventing the Siphoning of Traps
of Water-Closets.
No. 200,323. Patented Feb. 12, 1878.
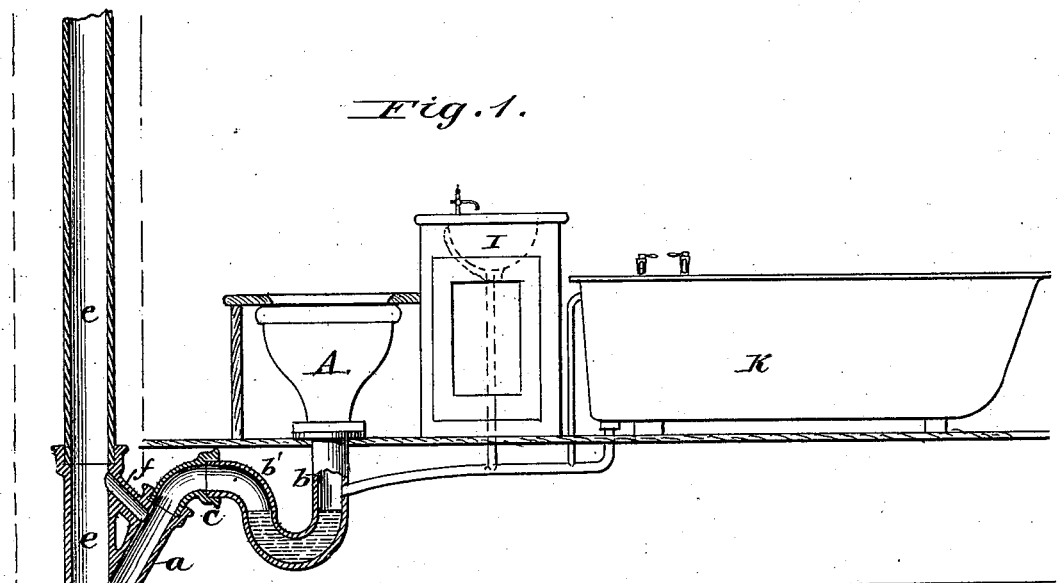
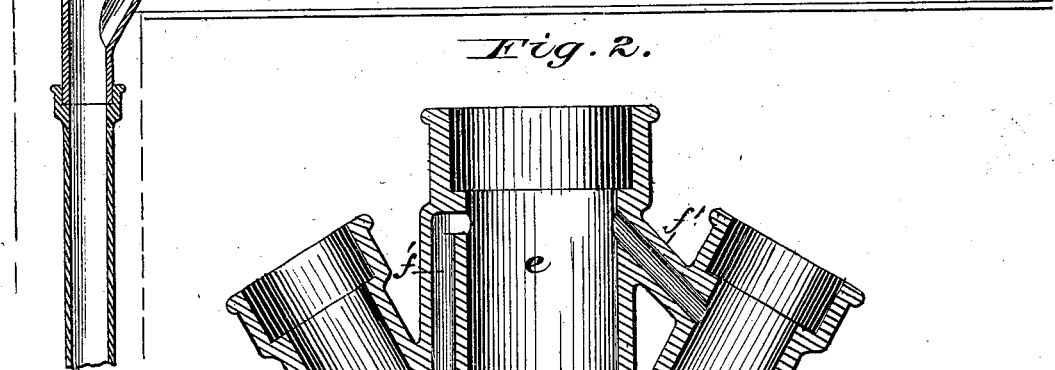
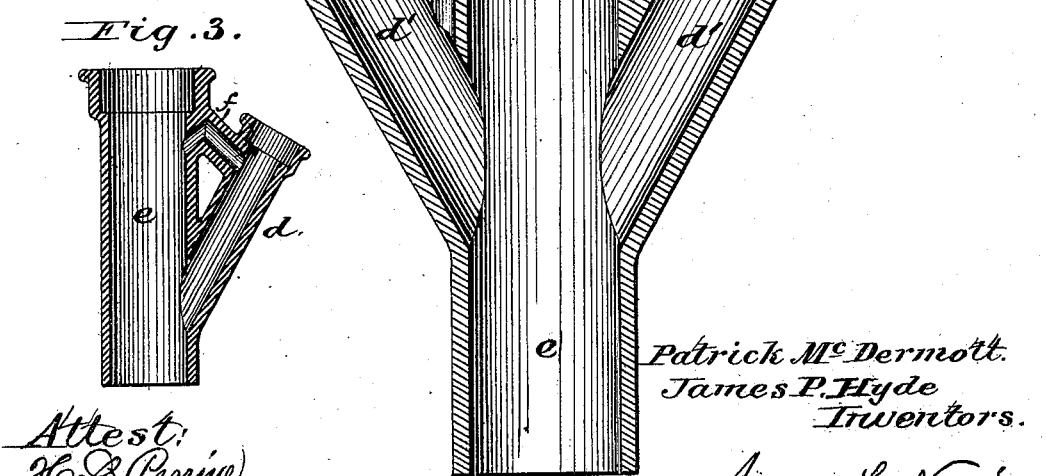
Patrick McDermott.
James P. Hyde
Inventors.
Attest:
H. B. Perine
J. A. Rutherford
By James L. Norris
Atty

UNITED STATES PATENT OFFICE.

PATRICK McDERMOTT AND JAMES P. HYDE, OF TREMONT, NEW YORK, N. Y.

IMPROVEMENT IN MEANS FOR PREVENTING THE SIPHONING OF TRAPS OF WATER-CLOSETS.

Specification forming part of Letters Patent No. 200,323, dated February 12, 1878; application filed February 4, 1878.

*To all whom it may concern:*

Be it known that we, PATRICK MCDERMOTT and JAMES P. HYDE, both of Tremont, in the city of New York and State of New York, have invented certain new and useful Improvements in Means for Preventing the Siphoning of Traps of Water - Closets, &c., of which the following is a specification:

Our invention relates to that class of drain pipes and traps in which is used a bent pipe or siphon-trap having a water-seal; and its object is to prevent the water from being drawn from these seals by siphonic action, as is frequently the case when a water - closet, basin, sink, bath-tub, or other entrance to a drain or sewer pipe is flushed. This occurs on account of water accumulating in the outer leg of the trap and the pipe connected thereto to such an extent as to overbalance the water in the intermediate limb, when, in accordance with the well-known natural law of siphons, the seal will be drained or the surface of the water therein so lowered from its effective sealing - level as to permit a free passage of air through the trap; and when this occurs the poisonous gases and foul air rising from the sewer to which the drain-pipe leads are permitted also to pass through the trap and escape into the house, contaminating the air which the occupants must breathe, spreading noisome odors, and engendering disease.

In the endeavor to prevent this evil, our invention consists in the combination, with the siphon-trap or water-seal of a drain-pipe, of an air-pipe communicating with said trap and terminating outwardly in a main drain-pipe to which air has access, in order that a supply of air may always be furnished to the outer limb of the trap, and foul gases prevented from accumulating in the drain-pipe to such an extent as to retard the flow of waste-water therethrough, and induce such an accumulation of water in said outer limb as to overbalance the seal and cause the same to broken by siphonic action.

In the accompanying drawing, Figure 1 represents a sectional view of a water-closet trap and drain-pipe having our improvement applied thereto. Fig. 2 shows an arrangement of a main drain-pipe adapted for connection with two branch drains at the same level. Fig. 3 shows a section of main pipe, branch drain, and air-pipe formed in one piece.

The letter A indicates the basin or pan of a water-closet, which opens directly downward in the upright limb $b$ of a siphon-trap, the inclined limb $b'$ of which is connected at $c$ to a branch drain or waste pipe, $d$, opening into a main drain-pipe, $e$. From a point in the branch pipe $d$, nearly on a level with the surface of the water-seal $g$ in the trap, an air-pipe, $f$, leads into the main drain-pipe, opening thereinto above the junction of pipe $d$ with said main drain-pipe. This pipe $f$ permits the escape of all foul air and light sewer-gases, which would otherwise fill the branch pipe $d$, and retard the escape of waste-water, and, consequently, these sewer emanations will not, by an accumulation of pressure, be forced through the trap and cause the gurgling or bubbling sound so familiar to those using the old form of trap without the air-tube, and which is a sure indication that the air of the room is being poisoned and rendered unfit for inhalation. This air-pipe also furnishes a constant supply of fresh air to the branch pipe $d$, and the pressure of this air counteracts any pressure on the basin end of the trap, and serves to break the continuity of any accumulation of water which would tend to overbalance the seal, so that said seal will always maintain its effective sealing-level and properly perform its intended function—namely, the preventing of the passage through the trap of any foul air, stench, or gases which endanger the health of the inmates of the house, or render the air therein disagreeable to inhale. In the old unimproved form of trap, siphoning has been a great objection, and particularly has this siphoning been liable to occur in these traps connected to basins adapted to hold a considerable quantity of water, which is replaced by an equal quantity each time the basin is used or a wash-basinful of water discharged.

Our invention is equally adapted to all kinds of sewer-connections ordinarily leading from dwellings or business-houses, and the several pipes and basins may be formed of iron, lead, earthenware, or any other material used in the manufacture of drain-pipe. It may be applied to systems of pipes already in place or at the original laying or placing. In applying it to pipes already in use, the branch pipe $d$ and main pipe $e$ may be simply tapped at proper points, and the air-pipe $f$ inserted and sealed with putty or cement, or soldered in when metal pipes are used; but when our invention is to be used at the original placing of the drain and waste pipes in a house, we use a section of main pipe, the branch pipe $d$, and the air-pipe $f$, all made in one piece by the ordinary method of casting or molding the material selected.

When the traps of two rooms on the same floor are to be connected to the same main drain-pipe or soil-pipe, we use the arrangement of main, branch, and air pipe shown in Fig. 2, in which $e$ indicates the main pipe, $d'$ $d'$ the branch waste-pipes, and $f'$ $f'$ the air-pipes. This arrangement of pipes we also make in one piece, ready for setting.

Having now fully described our invention, we claim—

1. The combination, with the trap or water-seal of a drain-pipe, of an air-pipe communicating with said trap and terminating outwardly in a main drain-pipe, to which the air has access, substantially as described, whereby siphoning is avoided and a perfect seal maintained.

2. As a new article of manufacture, a section of drain-pipe having an inclined branch, which is connected thereto near its divergent end by a smaller pipe or hollow arm, the whole formed in one piece of iron, lead, earthenware, or other suitable material, substantially as described.

In testimony that we claim the foregoing we have hereunto set our hands in the presence of the subscribing witnesses.

PATRICK McDERMOTT.
JAMES P. HYDE.

Witnesses to the signature of Patrick McDermott:
JAMES L. NORRIS,
JAMES A. RUTHERFORD.

Witnesses to the signature of James P. Hyde:
MICHAEL McDERMOTT,
FERDINAND MEYER.